(12) United States Patent
Rohmer

(10) Patent No.: US 7,075,009 B1
(45) Date of Patent: Jul. 11, 2006

(54) SCREWLESS FACEPLATE COMPONENTS AND ASSEMBLY

(75) Inventor: Richard M. Rohmer, Jordan, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 11/128,465

(22) Filed: May 13, 2005

Related U.S. Application Data

(63) Continuation of application No. 10/723,202, filed on Nov. 26, 2003, now Pat. No. 6,974,910.

(51) Int. Cl.
*H02G 3/14* (2006.01)

(52) U.S. Cl. .......................... 174/66; 174/67; 220/241

(58) Field of Classification Search ................ 174/66, 174/67; 220/241, 242; D8/353; D13/177
See application file for complete search history.

(56) References Cited

U.S. PATENT DOCUMENTS

| 327,212 | A | * | 9/1885 | Hubben et al. ............... 223/14 |
| 4,500,746 | A | | 2/1985 | Meehan |
| 4,733,330 | A | | 3/1988 | Tanaka et al. |
| 4,800,239 | A | | 1/1989 | Hill |
| 4,803,380 | A | | 2/1989 | Jacoby et al. |
| 4,835,343 | A | | 5/1989 | Graef et al. |
| 5,189,259 | A | | 2/1993 | Carson et al. |
| 5,955,702 | A | * | 9/1999 | Grossman et al. ............ 174/66 |
| 6,130,384 | A | * | 10/2000 | Esteves et al. ................ 174/66 |
| D493,695 | S | * | 8/2004 | Wengrower .................. D8/353 |

* cited by examiner

*Primary Examiner*—Dhiru R. Patel
(74) *Attorney, Agent, or Firm*—Daniel P. Malley; Bond, Schoeneck & King PLLC

(57) ABSTRACT

A screw less faceplate assembly includes of a single monolithic subplate component and a single monolithic faceplate component that is removably attachable to the subplate component. Both the subplate component and the faceplate component have complimentary, respective, reversible co-engagement means only located adjacent outer perimeter surfaces thereof. The subplate component is metallized or otherwise reinforced such that upon installation against an existing, potentially non-flat or uneven wall surface, the proper position and spacing of multiple electrical devices engaged with the subplate component are maintained. Embodiments of the invention include a subplate component and a faceplate component, and, upon assembly, a screw less faceplate assembly.

20 Claims, 18 Drawing Sheets

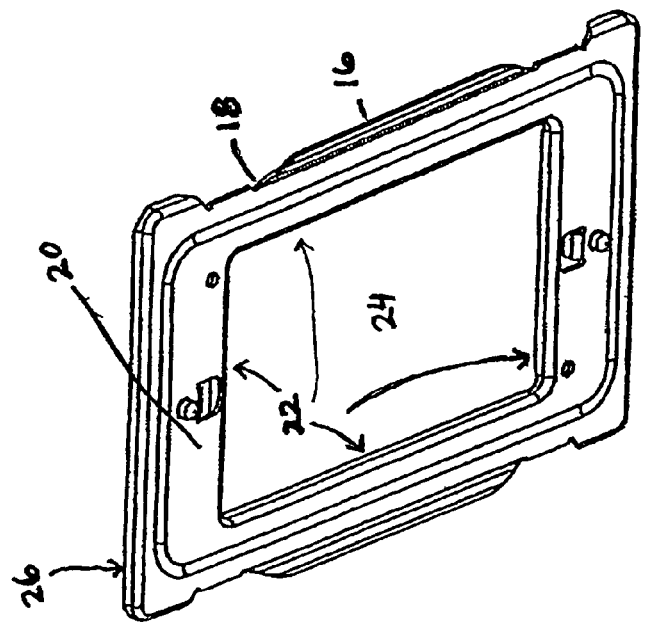
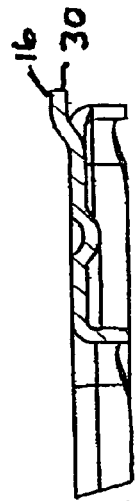
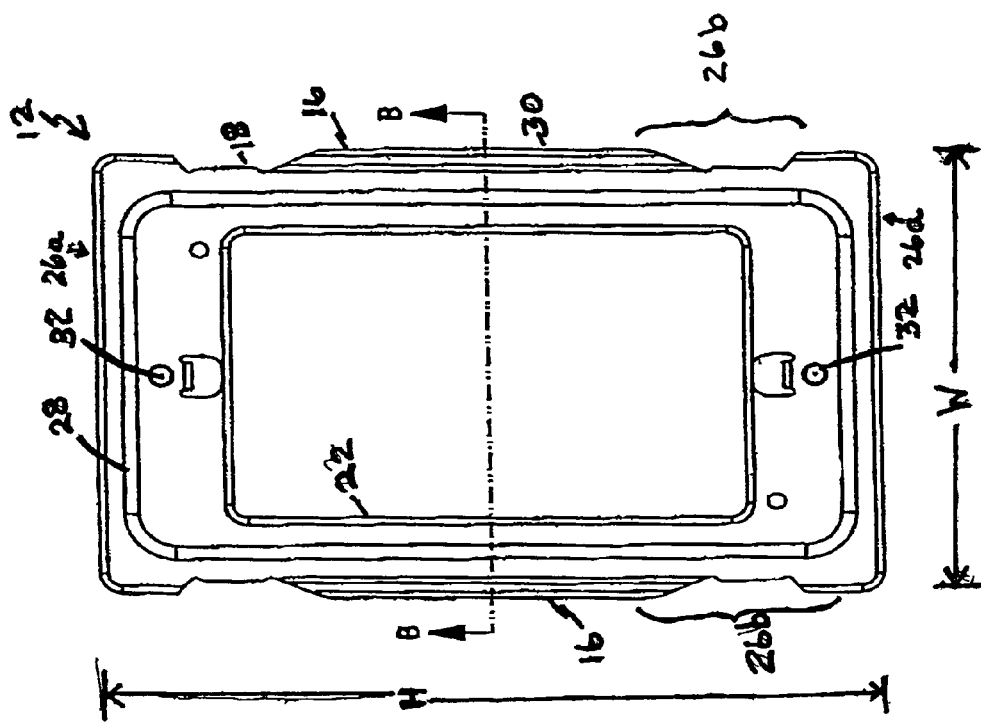

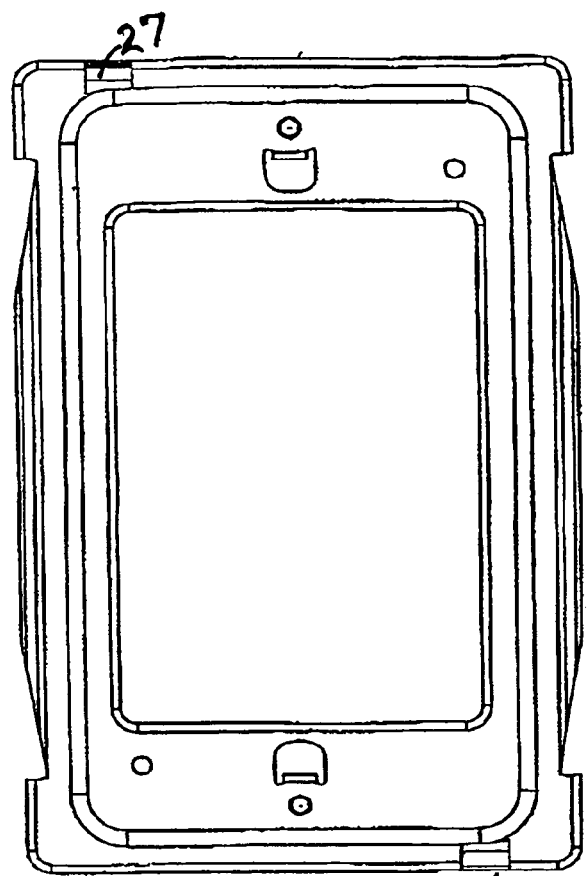
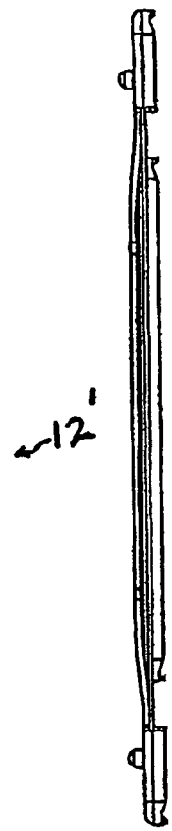
FIG. 2D   FIG. 2E
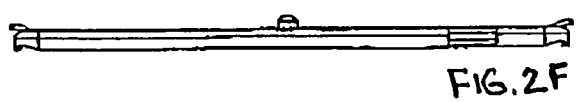
FIG. 2F
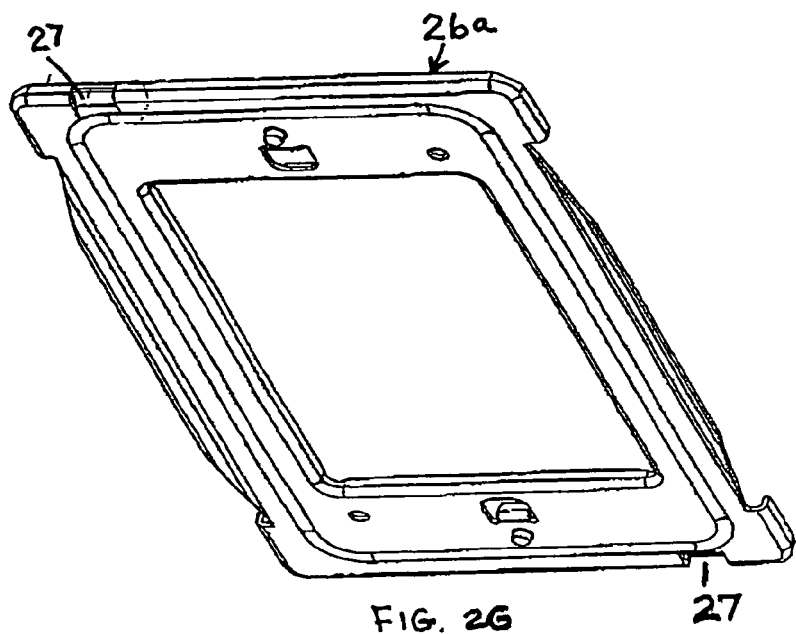
FIG. 2G

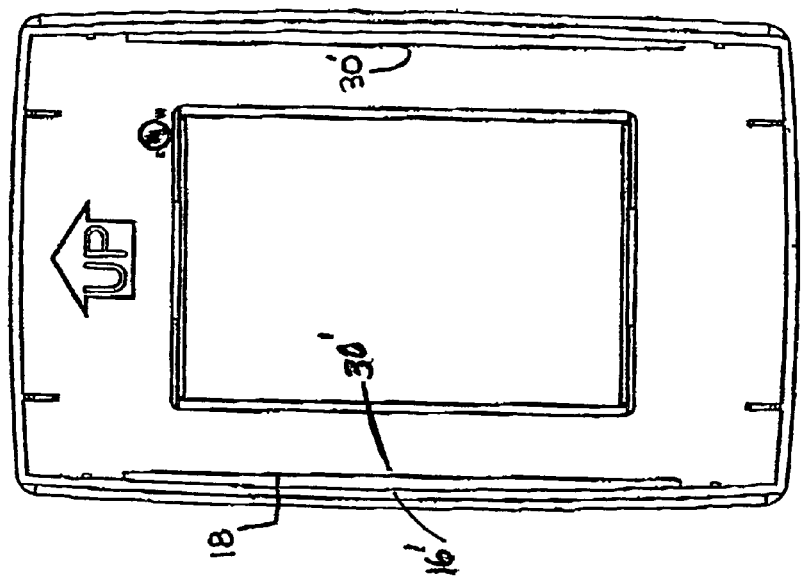
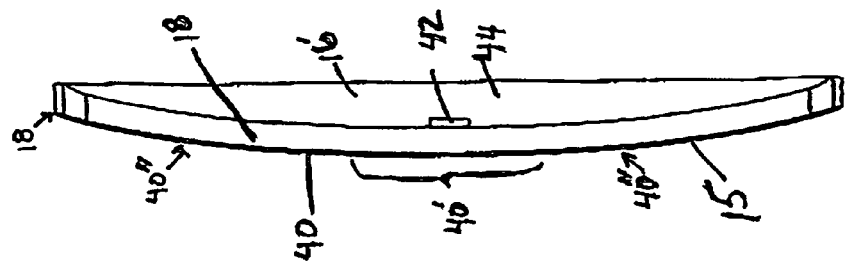
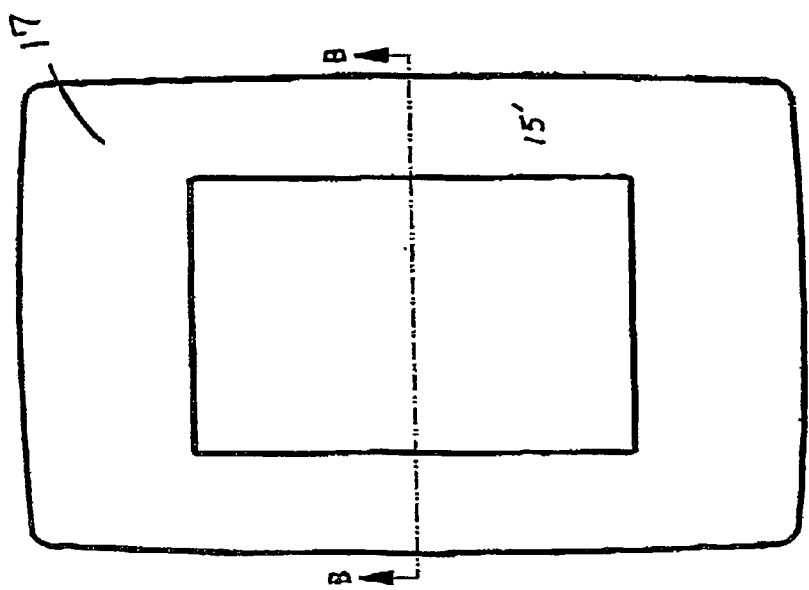
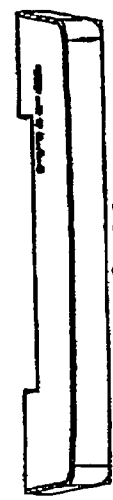

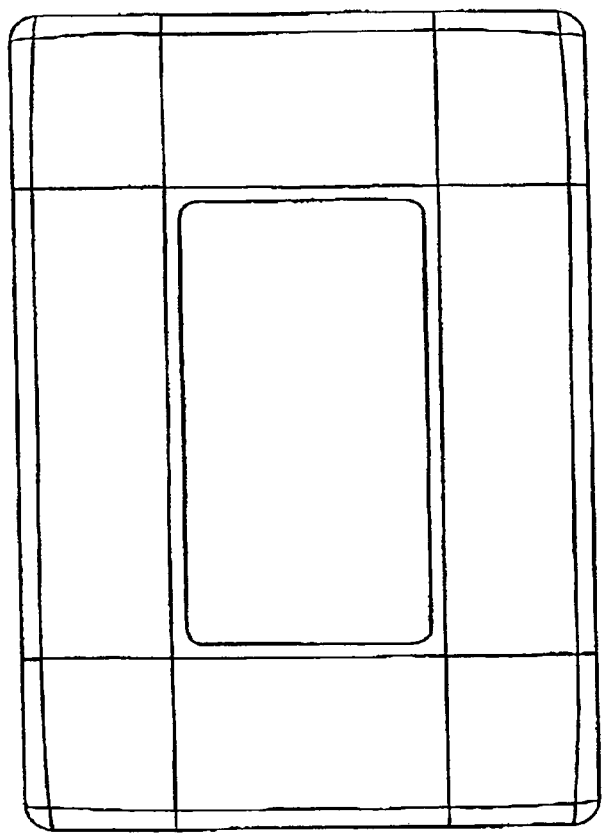
FIG. 4B
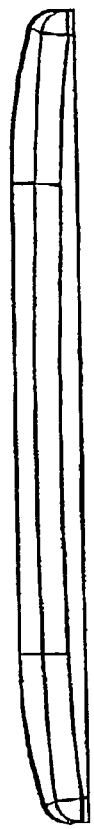
FIG. 4C
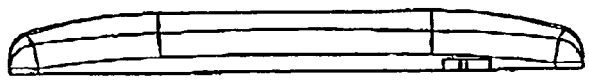
FIG. 4D
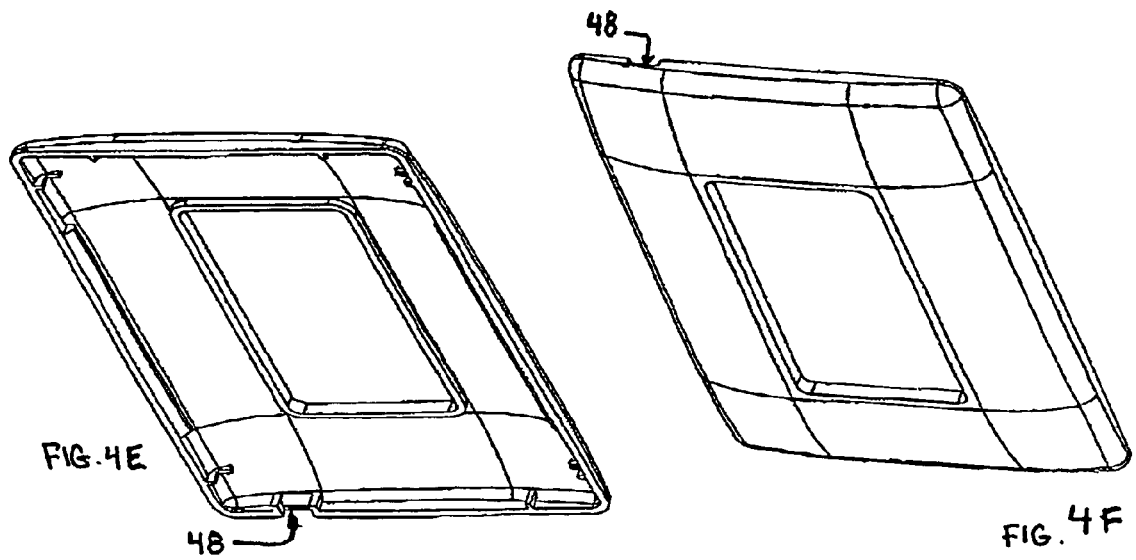
FIG. 4E
FIG. 4F

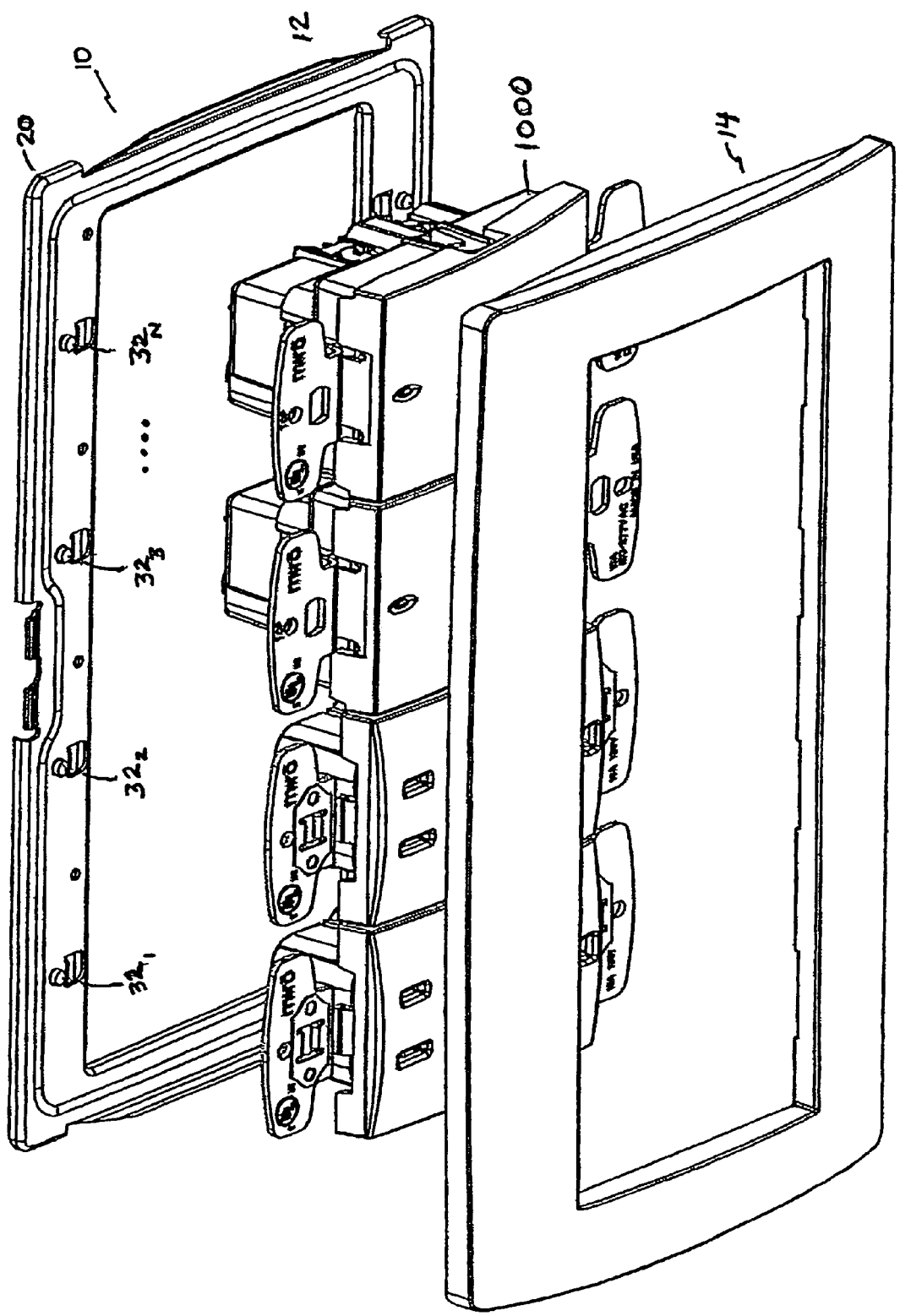

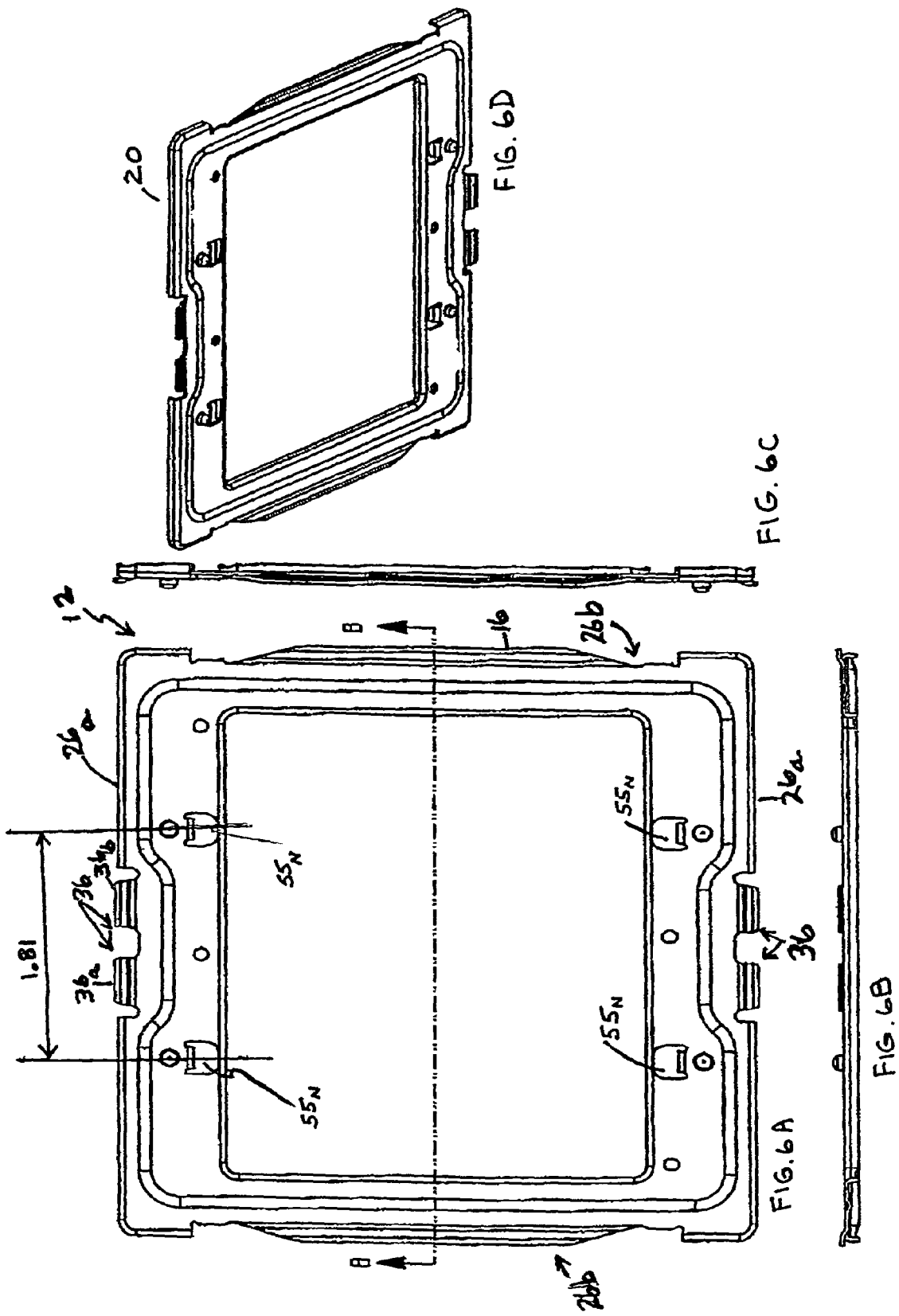

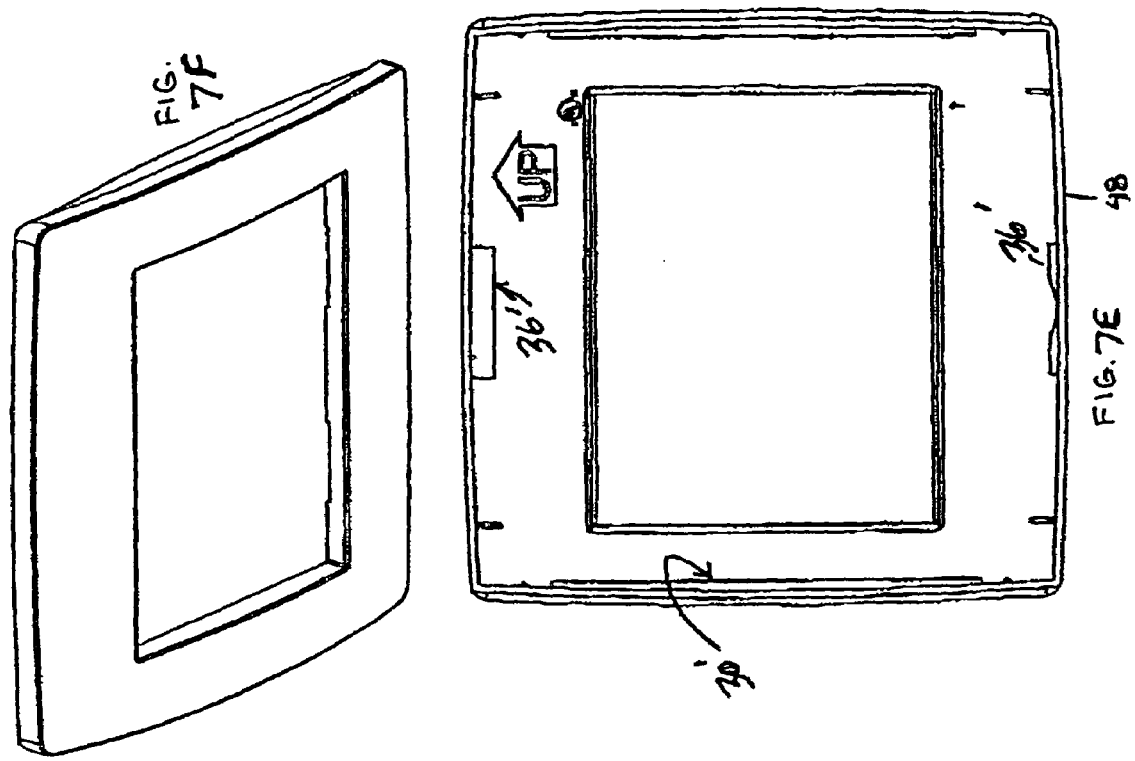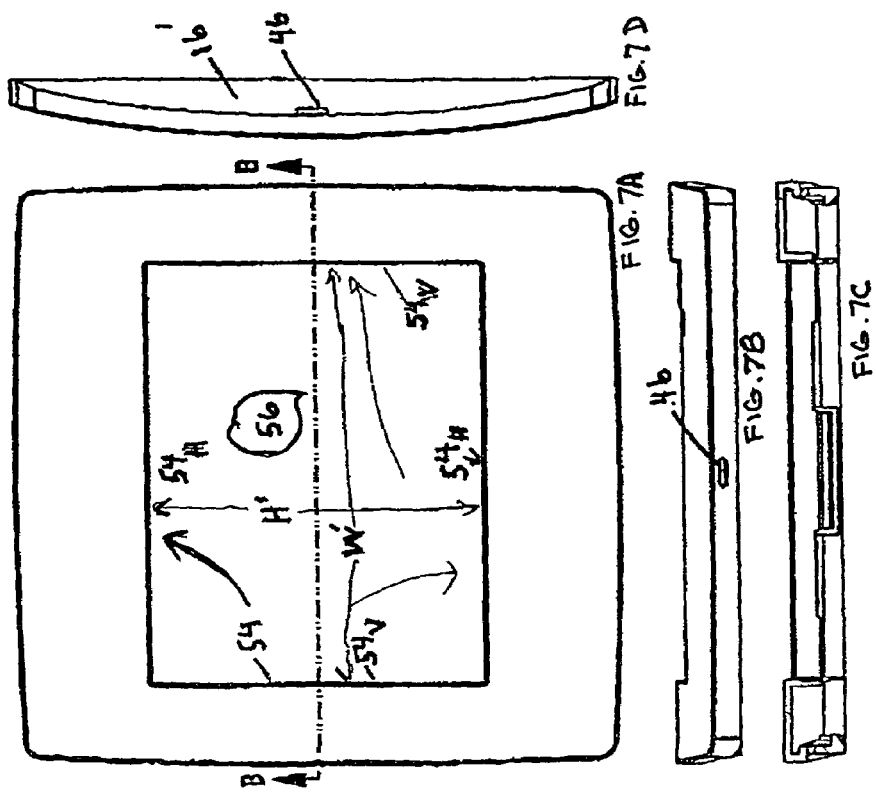

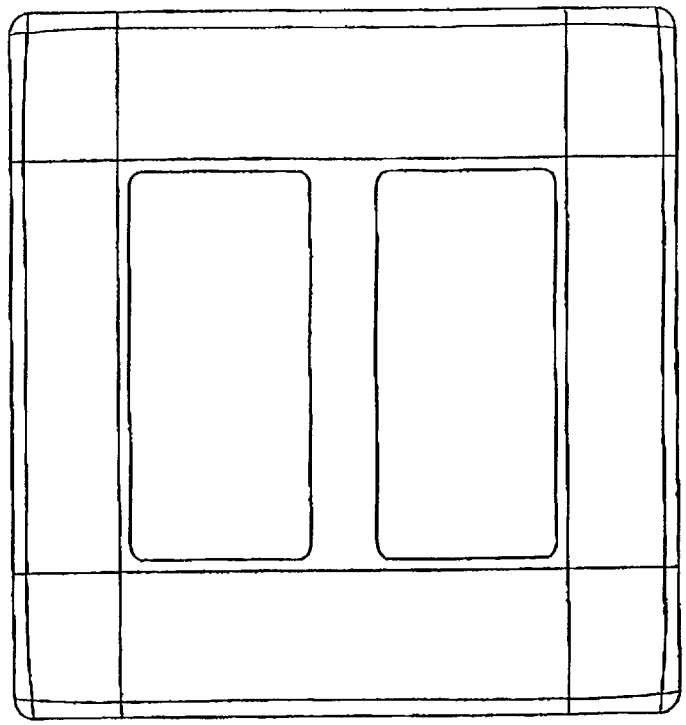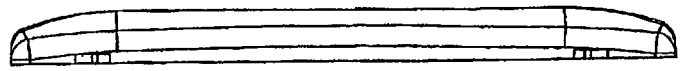
FIG. 7G
FIG. 7H
FIG. 7I
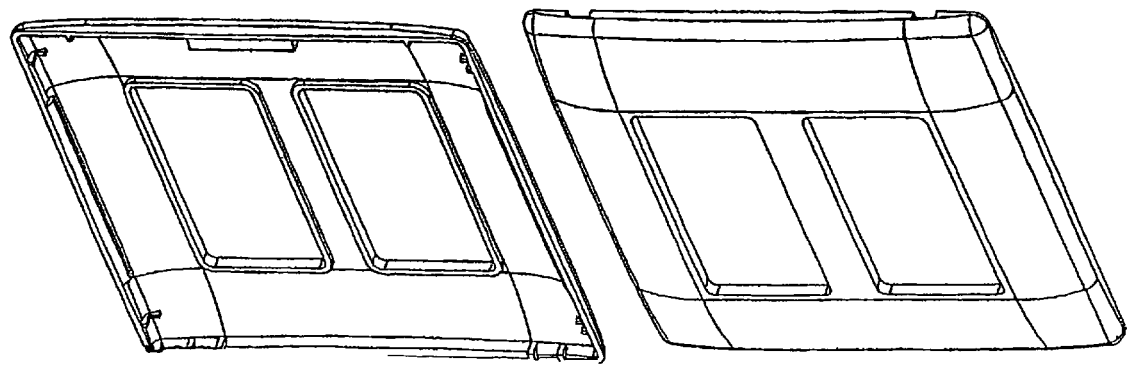
FIG. 7J
FIG. 7K

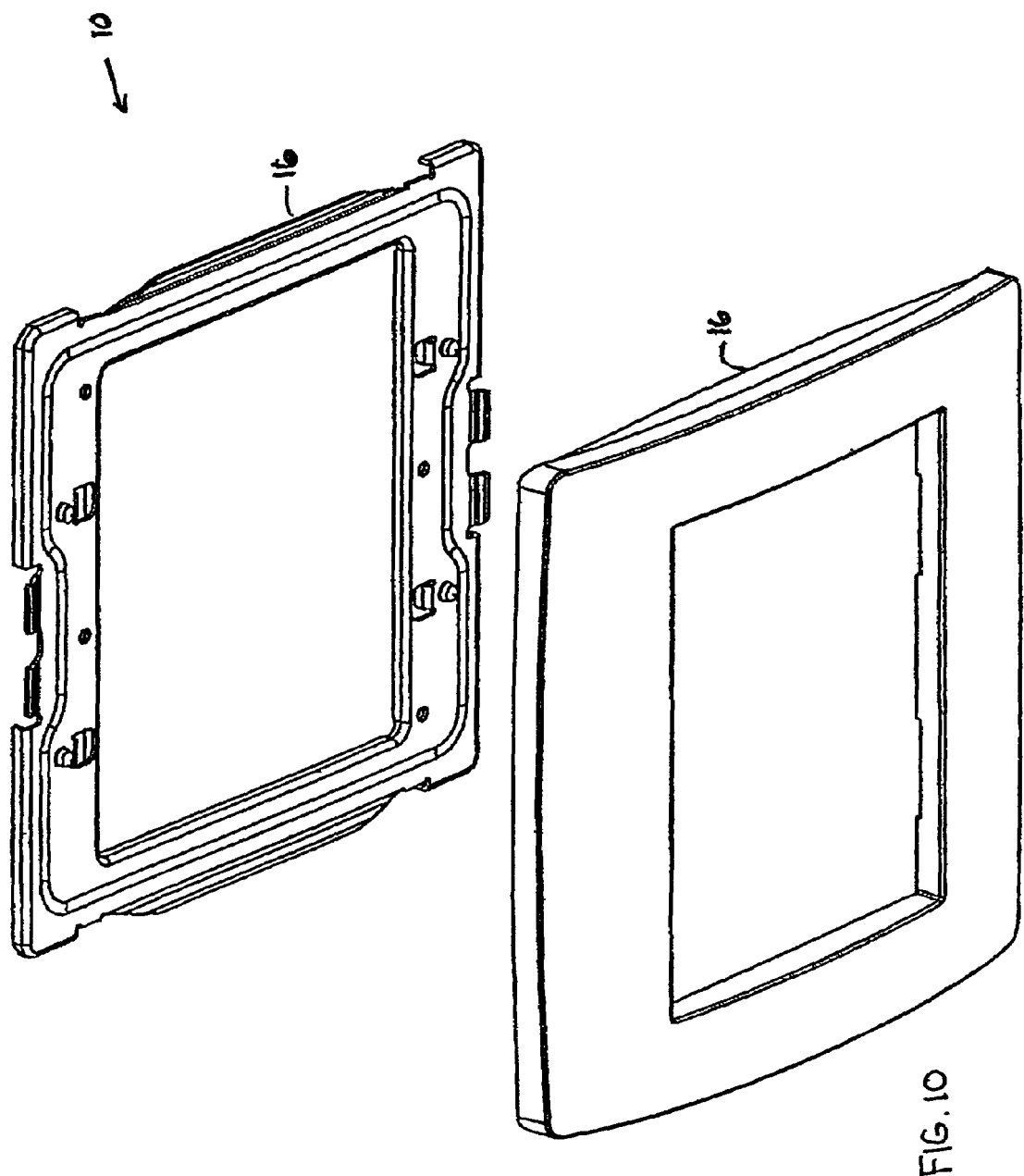

SCREWLESS FACEPLATE COMPONENTS AND ASSEMBLY

CROSS-REFERENCE TO RELATED APPLICATIONS

This is a continuation of U.S. patent application Ser. No. 10/723,202 filed on Nov. 26, 2003, now U.S. Pat. No. 6,974,910, the content of which is relied up and incorporated herein by reference in its entirety, and the benefit of priority under 35 U.S.C. § 120 is hereby claimed.

BACKGROUND OF THE INVENTION

1. Field of the Invention

Embodiments of the invention are generally directed to the field of electrical wiring components, and more particularly to a screwless faceplate assembly and the components thereof, for use in conjunction with an electrical receptacle box or the like.

2. Description of Related Art

Conventional electrical box cover plates, referred to herein as faceplates, are typically constructed in the form of a flat plastic or metallized plate having one or more openings that provide access to a wired device mounted in the electrical box. The purpose of the faceplate is to provide a decorative cover for the electrical box installation while also preventing operator exposure to the interior of the electrical box, which contains electrical wiring. As used herein, "wired device" refers generally to any of a variety of electrical power control/distribution devices including, but not limited to, ON/OFF switches, outlet receptacles, dimmers, motor speed selector switches and the like, to certain communications/data connectors such as telephone jacks, coaxial cable connectors, TV antenna connectors, and computer network cable connectors, informational devices such as clocks, thermometers, security systems, and so on.

Wiring devices conforming to NEMA standards include a metal yoke or mounting strap with oversized mounting slots that permit horizontal position adjustment of the wiring device within an electrical box. The yoke strap also includes one or more threaded mounting holes for attaching a faceplate onto the yoke strap by screw fasteners, thereby completing the enclosure of the device and wiring terminations within the electrical box. The enclosed wiring device(s) may have a switch actuator, control knob, power receptacle or the like which is supported on the mounting strap by an insulating escutcheon. The faceplate access opening is closely conformed about the escutcheon to limit operator access to electrical terminals and wiring within the electrical box.

Traditionally, faceplates have been mounted onto the yoke strap of a wiring device by standard 6/32 screw fasteners. U.S. Pat. No. 5,189,259, incorporated herein by reference in its entirety to the fullest extent allowed, discusses various shortcomings associated with using screw-type faceplates. In response to the identified shortcomings, the '259 patent discloses a faceplate having a press-fit attachment to electrical switches, outlets and the like, that includes a mounting plate (subplate) sandwiched between a wall mounted electrical box and an electrical device attached by conventional screw fasteners to the electrical box, and a cover plate (faceplate) that can be snap-fit to the support plate without the use of screw type fasteners or other external fastening means. Notwithstanding the benefits and advantages offered by the faceplate assembly set forth in the '259 patent, the assembly described therein presents space for further improvements in screw less faceplate assemblies. The '259 patent discloses a multi-gang coupling plate that is segmented and apparently intended for use in "new" construction. In new construction, the electrical-box is typically nailed or otherwise fastened to the side of a vertical wall-stud member. Supply conduit is fed into and secured to the electrical box and a wall surface material such as sheetrock or wallboard is affixed to the stud members. A measured cutout in the wall material is made to accommodate the opening of the electrical-box. The wall surface may be installed in ill-measured pieces that may not provide an even or smooth finished surface. Moreover, the wall surface may have a textured finish, or a fabric finish, that may not be even or firm. The segmented construction of the coupling plate, along with the observation that the coupling plate is likely of a plastic or similar semi-rigid material, may not provide the desired rigidity that upon installation will smoothly cover an uneven, soft, or defective wall surface. On the other hand, in remodeling work it is not always practical to remove large sections of existing wall surface merely to mount electrical boxes and run cable. In this case, "old work" or "remodel" electrical boxes are commercially available. They are designed to clamp to the existing wall surface via mounting tabs on the electrical box, which cinch up to the inside surface of the wall board which itself is in contact with a tab or flange member of the "old work" electrical box. The interested reader is directed to the website http://www.hammerzone.com/archives/elect/remodel1/lighting/track2ft/oldworkbox.htm for clear pictures and accompanying discussion about installing an "old work" electrical (receptacle) box. A faceplate assembly, whether of the screw type or screwless, must in some manner completely cover the physical extensions of the old work electrical box, which are not present in the new construction type box.

SUMMARY OF THE INVENTION

An embodiment of the invention is directed to a subplate component of a screw less faceplate assembly for use in conjunction with an electrical box. In an aspect of the embodiment, the subplate consists of a single monolithic subplate component in the form of a frame including a front surface and a back surface and having an outer perimeter defined by opposing outer horizontal surfaces and opposing outer vertical surfaces which include an integrated attachment structure, and an inner perimeter defined by smooth and continuous inner horizontal and vertical edges, said inner perimeter defining an uninterrupted subplate opening for accommodating one to N-gang electrical devices, where N is $\leq 8$. In various aspects, the attachment structure forms at least part of the outer perimeter edge or is an integral portion of the outer perimeter surface. In a single gang aspect, the attachment structure is a lip extending along a portion of the outer vertical perimeter surfaces. In a multi-gang aspect, the attachment structure includes a lip extending along a portion of the outer vertical perimeter surfaces and an engagement assembly integrated into the outer horizontal perimeter edges. The engagement assembly may comprise two adjacent lips. All of the lips (alternatively, wings or catch-edges, and equivalent structures or edge-surface formations) are intended to be removeably engageable with complimentary attachment regions and structures in a faceplate component of a screw less faceplate assembly. Various aspects of the subplate component relate to the substantial rigidity of the subplate. In one aspect, the subplate component is a metallized material. In another aspect, the subplate is made in whole or in part of a material having a Young's Modulus of between about 6 Mpsi to 42 Mpsi.

Alternatively, the subplate component is otherwise physically reinforced by a material or structural modification, such as a continuous or segmented gusset rib, for example, in the front or back surface. The subplate component has an outer perimeter dimension that is as large or larger than a maximum perimeter dimension of a face surface of an "old-work" electrical box such that it will cover the perimeter region of an old-work electrical box. In another aspect of the subplate embodiment, the subplate includes at least one set (pair) of vertically-aligned posts for locating an electrical device with respect to the subplate frame/opening. In an aspect, the subplate includes N sets of separate vertically-aligned posts for locating N electrical devices with respect to the subplate frame/opening. In various aspects, the subplate opening is sized to accommodate a single-gang or multi-gang devices. According to aspects of the embodiment, the outer horizontal edges of the subplate have a separation distance of about 4.55 inches, and the outer vertical edges have a separation distance of about 2.85 inches; about 4.66 inches; about 6.47 inches; or about 8.29 inches, for one-gang to four-gang assemblies, respectively. Up to eight-gang dimensions are envisioned, having similarly increasing vertical edge separation dimensions.

Another embodiment of the invention is directed to a faceplate component of a screwless faceplate assembly. A monolithic faceplate component of a screwless faceplate assembly consists of a frame having a front surface and an outer perimeter surface along an edge of the front surface, and an attachment surface disposed along at least two opposing perimeter surfaces including an attachment structure disposed along or immediately adjacent at least a portion of the attachment surface. In an aspect of the embodiment, the attachment structure is a lip (or cove, wing, or equivalent structural form) that is removeably engageable with a complimentary attachment structure of a subplate component of a faceplate assembly. In various aspects, the attachment structure of the faceplate component may be a single integrated lip disposed along or immediately adjacent at least a portion of the attachment surface or perimeter surface, or plurality of lips. In another aspect, the faceplate has a disengagement aperture in the attachment surface and/or perimeter surface to facilitate disengagement with the subplate component in an assembled condition. The faceplate component has an inner perimeter defined by smooth and continuous inner opposing horizontal and opposing vertical edges or surfaces. The inner perimeter defines a faceplate opening for accommodating one or more electrical device bodies. In respective aspects, adjacent horizontal inner perimeter edges have a clear separation distance of about 2.68 inches and adjacent vertical inner perimeter edges have a clear separation distance of about 1.85 inches; about 3.66 inches; about 5.47 inches; and about 7.28 inches, for one-gang to four-gang assemblies, respectively. In an aspect, the faceplate component will include vertically oriented support regions within the opening while still providing suitable opening dimensions for electrical device bodies. In another aspect of the faceplate component embodiment, the front surface of the faceplate component has an elliptical profile along a vertical cross-section. The profile could alternatively be flat.

Another embodiment of the invention is directed to a screwless faceplate assembly. In an aspect of this embodiment, the screw less faceplate assembly consists of a single monolithic subplate component and a single monolithic faceplate component that is removeably attachable to the subplate component, wherein the subplate component and the faceplate component have respective, integral, complimentary, co-engagement means only located on or immediately adjacent outer perimeter surfaces thereof. In an aspect of the embodiment, the subplate component and the faceplate component described herein form the assembly components.

Embodiments of the invention as set forth herein will be fully understood with reference to the following detailed description, accompanying drawing figures, and as defined in the appended claims.

BRIEF DESCRIPTION OF THE DRAWINGS

FIG. 2A is a front elevation view of a subplate component according to an embodiment of the invention;

FIG. 2B is a perspective view of the subplate component of FIG. 2A;

FIG. 2C is a bottom cross-sectional view of the subplate component of FIG. 2A showing the detail as indicated;

FIGS. 2D–G are views similar to FIGS. 2A–C for an alternative aspect of the subplate component;

FIGS. 3A–E are, respectively, a front elevation view, a bottom elevation view, a bottom cross-sectional view, a side elevational view, and a back elevational view of a single-gang faceplate component according to an embodiment of the invention;

FIGS. 4B–F are various views of an alternative aspect of a faceplate component according to an embodiment of the invention;

FIG. 5A is an exploded perspective view of a 4-gang screwless faceplate assembly according to an embodiment of the invention;

FIGS. 6A–D are, respectively, a front elevational view, a bottom cross-sectional view, a side elevational view, and a perspective view of a 2-gang subplate component according to an aspect of the invention;

FIGS. 7A–F are, respectively, a front elevational view, a bottom elevational view, a bottom cross-sectional view, a side elevation view, a back elevation view, and a perspective view of a 2-gang faceplate component according to an aspect of the invention;

FIGS. 7G–K are various views of an alternative aspect of a 2-gang faceplate component according to an embodiment of the invention;

FIG. 10 is an exploded perspective view of a 2-gang screw less faceplate assembly according to an embodiment of the invention;

DETAILED DESCRIPTION OF EMBODIMENTS OF THE INVENTION

As described and claimed herein, embodiments of the invention relate, respectively, to a subplate component, a faceplate component, and a screwless faceplate assembly consisting of a subplate component and a faceplate component. Throughout the following detailed description, mixed references will be made to the individual components and the assembly consisting of the components to give the reader a comprehensive understanding of the various embodiments.

Figure 1:
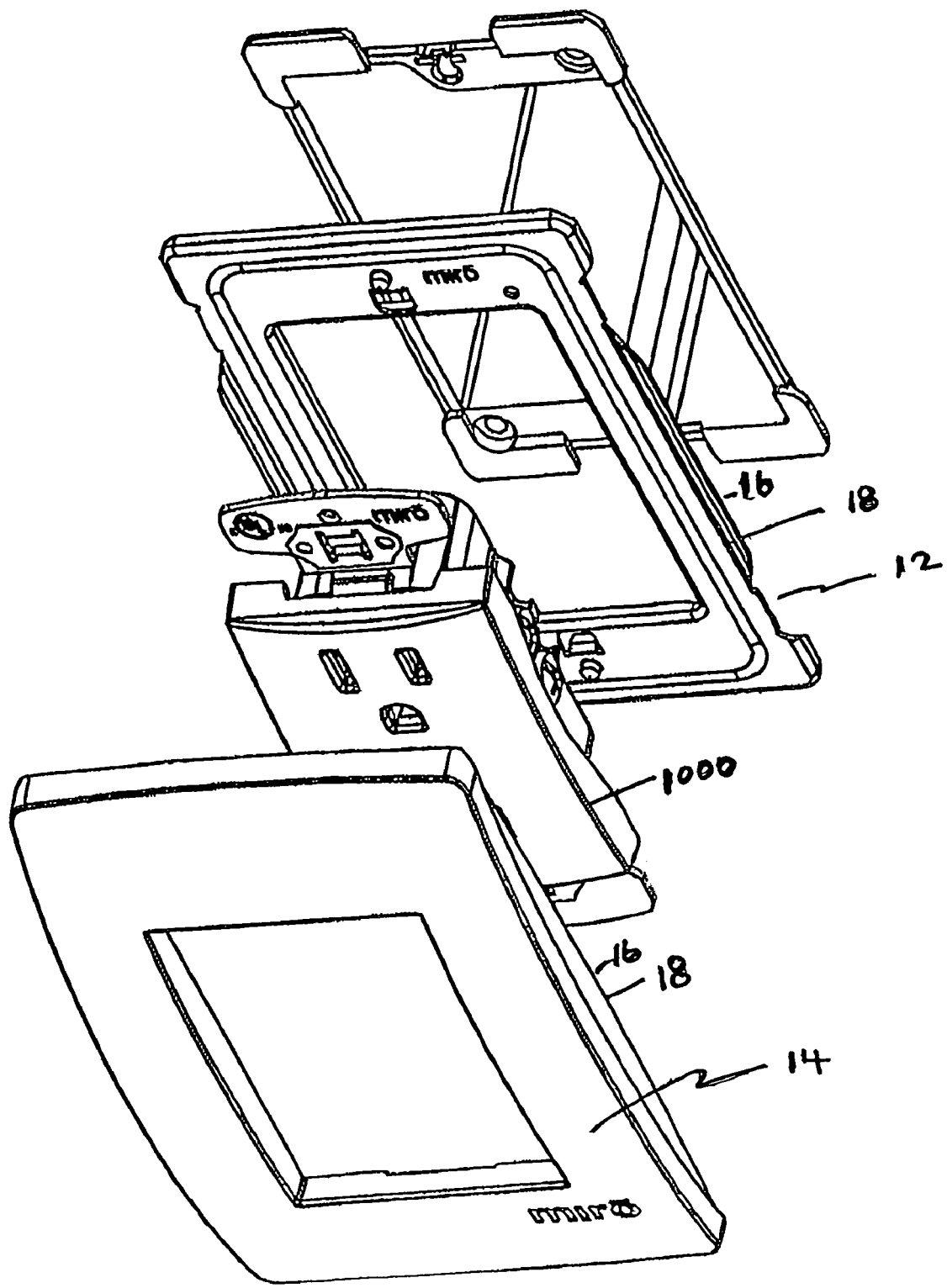
FIG. 1 is an exploded perspective view of a screwless faceplate assembly for a single-gang device according to an embodiment of the invention.
Figure 4A:
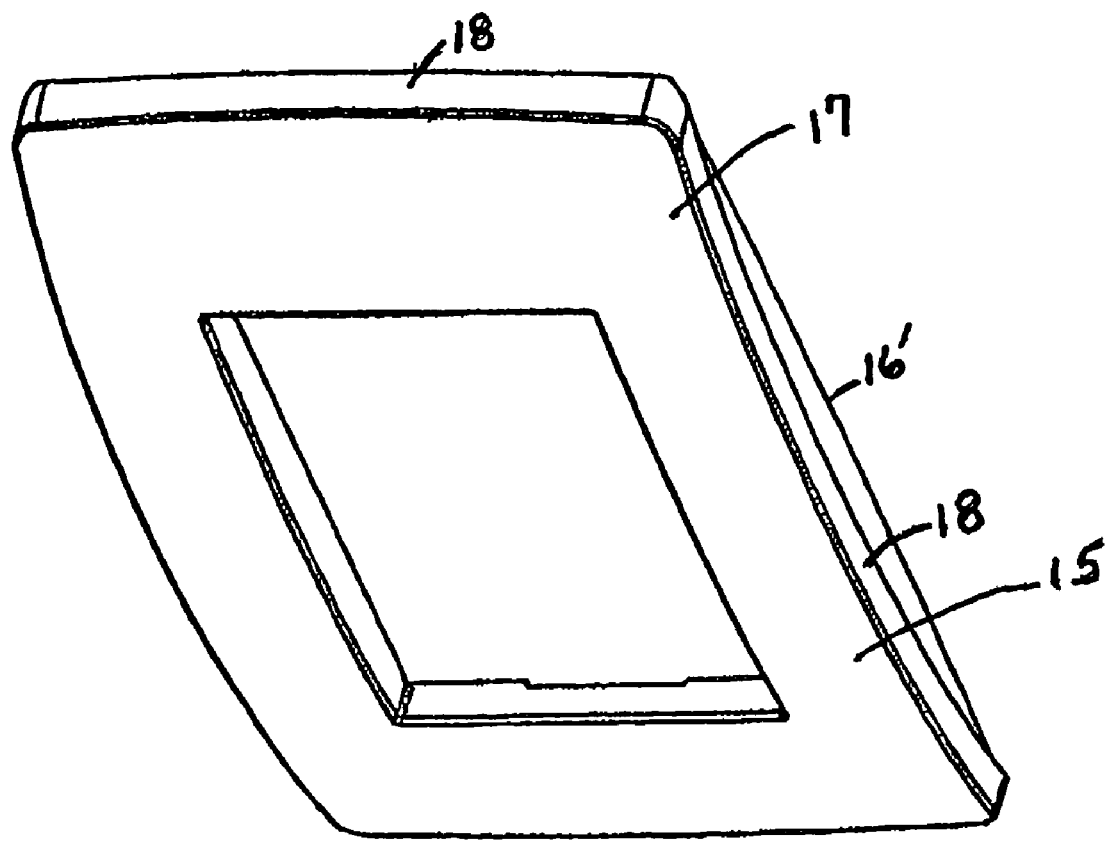
FIG. 4A is a perspective view of the faceplate component of FIG. 3.

Exploded views of exemplary aspects of a screw less faceplate assembly 10 are illustrated in FIGS. 1, 5A, 8 and 10. The faceplate assembly 10 consists of a subplate component 12 and a faceplate component 14 that is removably attachable to the subplate without the use of screw fasteners or other external attachment means. The subplate component and the faceplate component have respective, integral, complimentary, reversible co-engagement means only located on, or immediately adjacent, outer perimeter surfaces thereof as illustrated in FIGS. 1, 2 and 4A.

Figure 8:
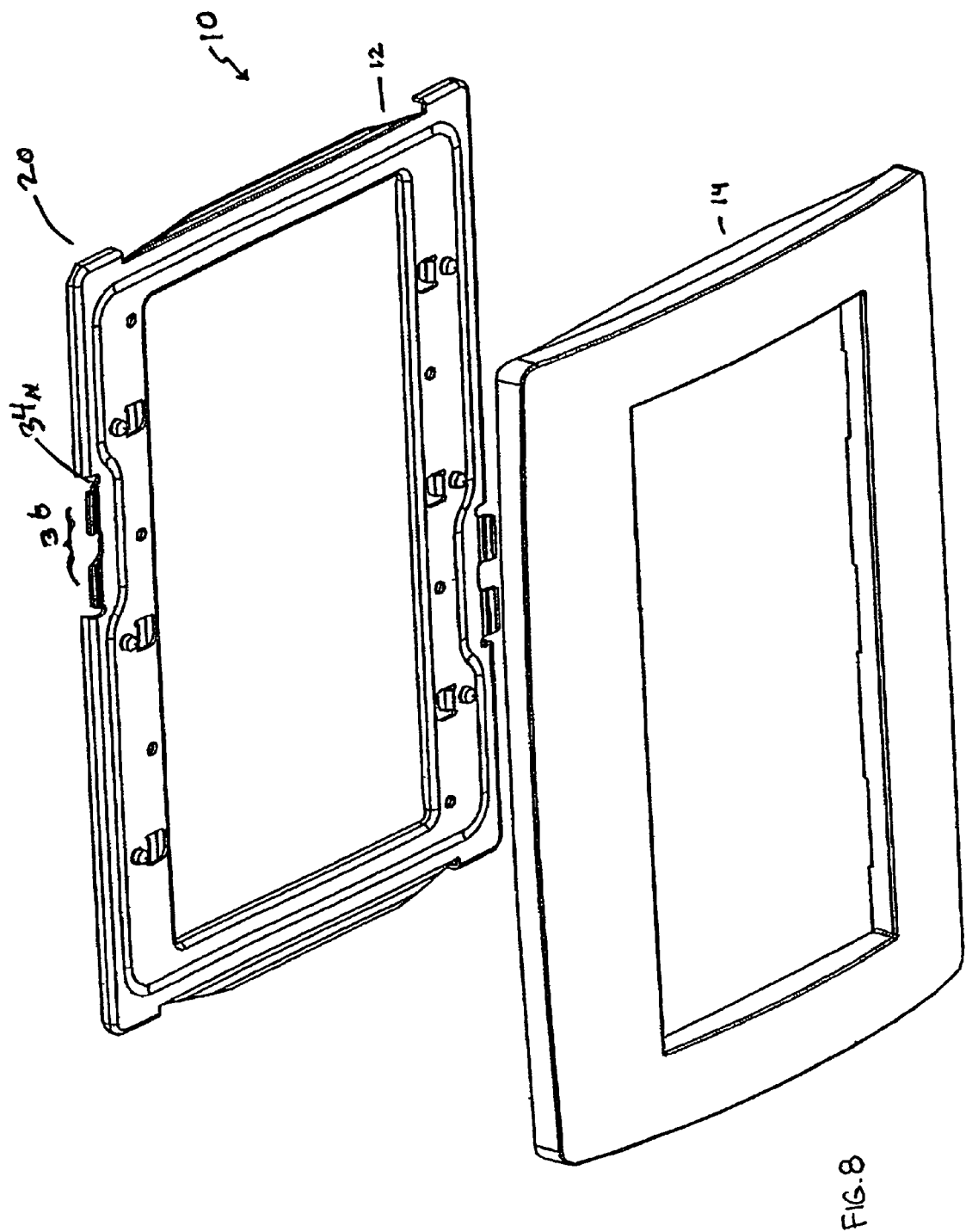
FIG. 8 is an exploded perspective view of a 3-gang screwless faceplate assembly according to an embodiment of the invention.
Figure 9:
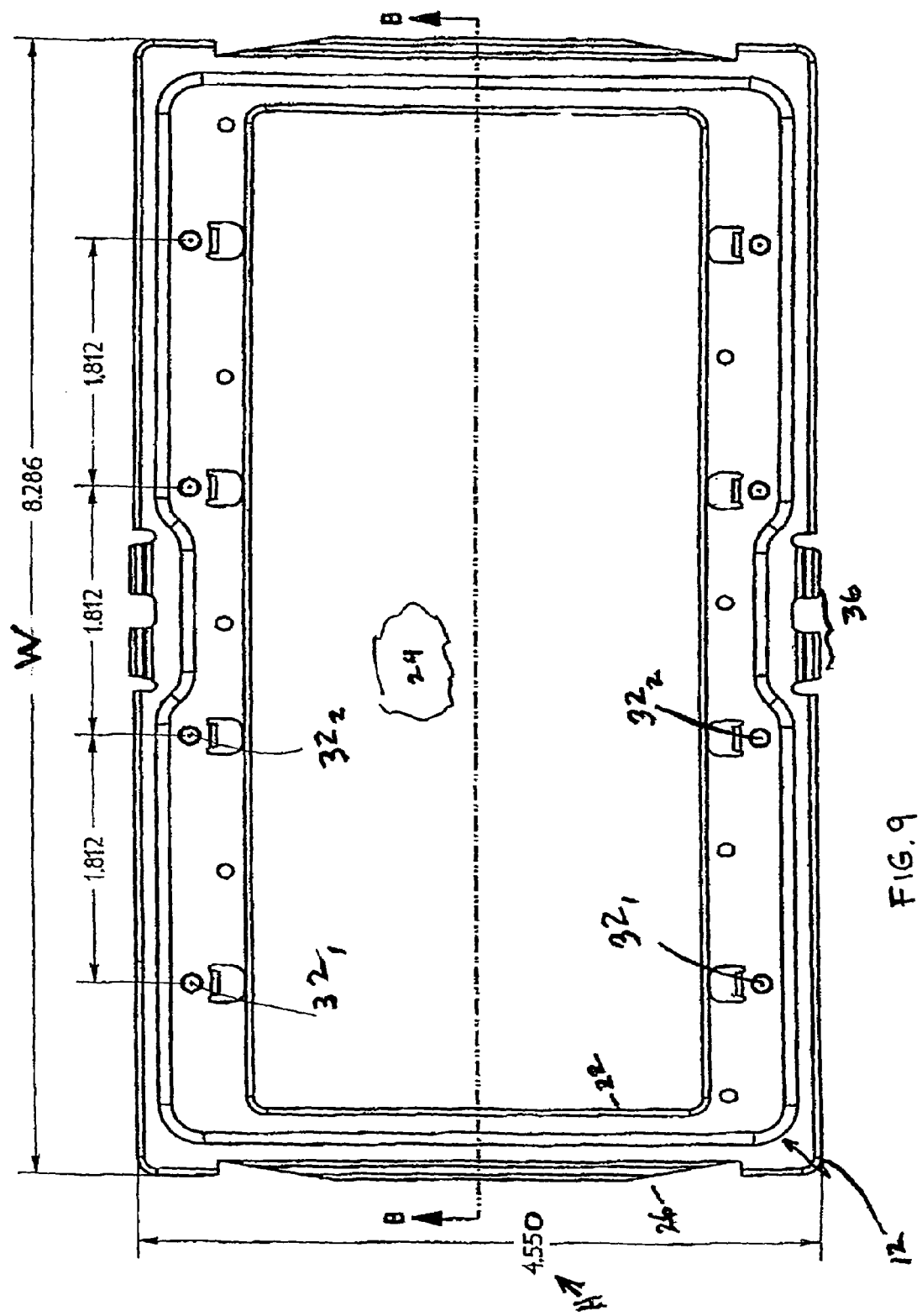
FIG. 9 is a front elevational view of a 4-gang subplate component according to an exemplary aspect of the invention.

An exemplary aspect of a single-gang subplate component 12 is illustrated in FIGS. 2A–C. The subplate component 12 is a single monolithic structure in the form of a frame 20 as shown in FIG. 2B for a single-gang structure; in FIG. 6D, for a 2-gang structure; in FIG. 8 for a 3-gang structure; and in FIG. 5A for a 4-gang structure. Embodiments of the subplate component, the faceplate component, and the screwless faceplate assembly may include up to N=8-gang capacity; however, the description will refer only to embodiments for N<4-gang. The frame 20 has an outer perimeter 26 defined by opposing outer horizontal surfaces 26a and opposing outer vertical surfaces 26b. As shown in FIG. 2A for a single-gang component, surface 26b has an integral attachment structure 16 in the form of a lip 30. The lip 30 is continuous and extends along a portion of vertical edge 26b. The lip 30 provides a surface that can cooperatively engage a complimentary attachment structure on a faceplate as will be further described below. FIG. 6A shows a 2-gang subplate component 12. In addition to the integral attachment structure 16 along a portion of vertical edge 26b, a single engagement assembly 36 forms an integral part of horizontal edge 26a. The engagement assembly 36 has two adjacent lips 36a, 36b that can cooperatively engage a complimentary attachment structure on a faceplate. The presence of the engagement assembly 36 in a multiple-gang subplate component provides additional screw less fastening integrity for the faceplate assembly. FIGS. 8 and 9 show exemplary 3-gang and 4-gang subplates, respectively. Mounting apertures $55_N$ (N=gang number) are provided for mounting an electrical device to an electrical box with conventional screw fasteners. In an exemplary aspect, the subplate component 12 has up/down symmetry with respect to its assembly orientation as shown in FIG. 6A and elsewhere.

An alternative aspect of the subplate component 12 is illustrated in FIGS. 2D–G for a single-gang component. The subplate has a disengagement region 27 in a portion of the outer horizontal perimeter surface 26a. The disengagement region 27 will accommodate the insertion of a screwdriver tip or similar device through a complimentary disengagement aperture in a faceplate component of the assembly.

The subplate component frame 20 shown in FIGS. 2A,B for a single-gang component is further defined by an inner perimeter 22 having smooth and continuous inner opposing horizontal surfaces and opposing vertical surfaces, which frame an uninterrupted subplate opening 24. The opening 24 is sized for accommodating an N-gang electrical device body as illustrated in FIGS. 6D, 8 and 9.

Figure 6E:
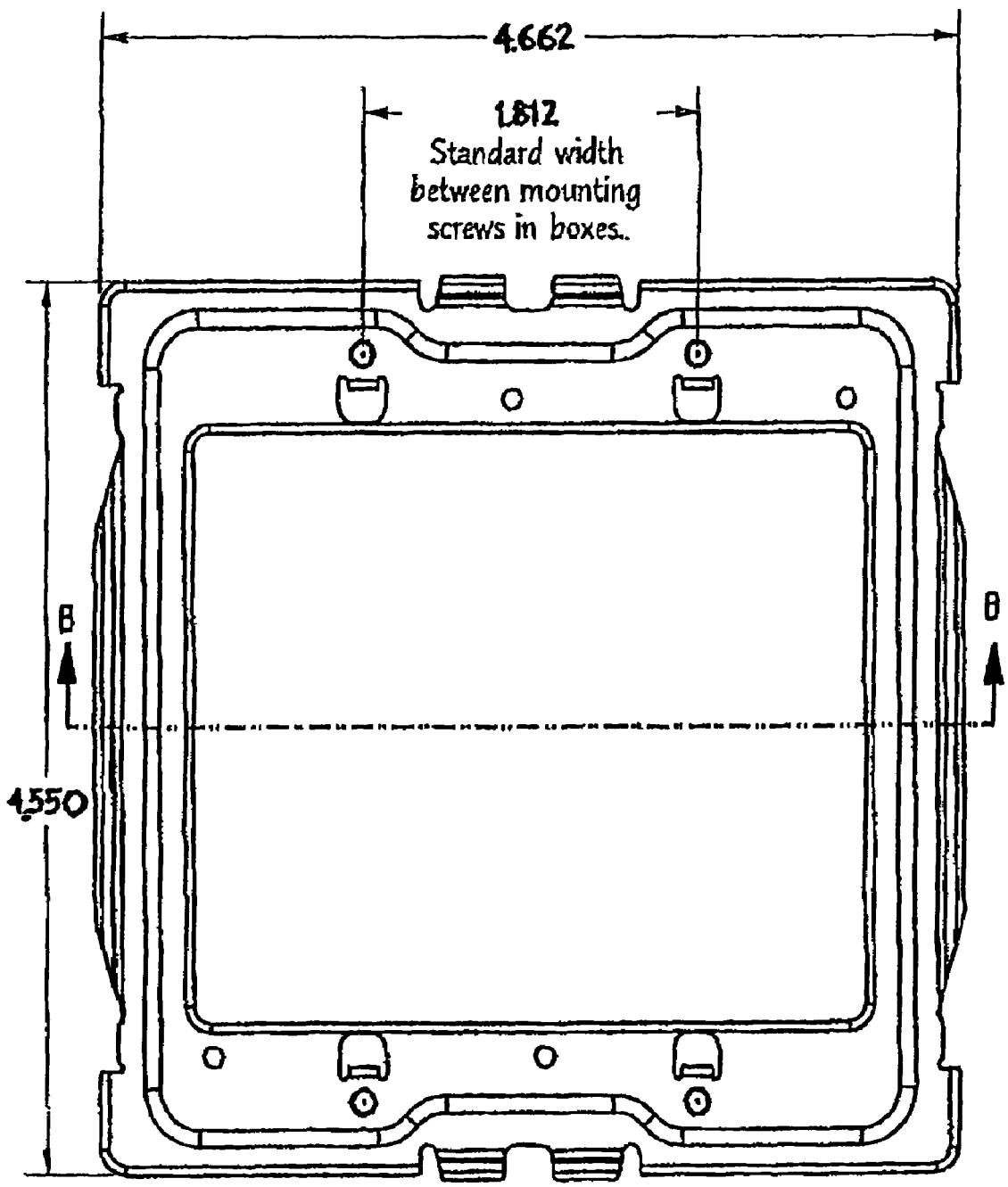
FIG. 6E is identical to FIG. 6A with the exception of measurement indicia for further clarity.

The outer perimeter 26 of the subplate component 12 has a height dimension, H, and a width dimension, W, as illustrated FIG. 9. As shown in FIG. 2A for a single gang device, it is sized to cover the maximum perimeter of an old-work electrical box. In an exemplary single gain device embodiment, H=4.55 inches, W=2.85 inches. For N=2, H=4.55 inches, W=4.662 inches to accommodate a standard width device mounting of 1.812 inches as illustrated in FIG. 6E. For N=3, H=4.55 inches, W=6.474 inches; and for N=4, H=4.55 inches, W=8.286 inches (see Table 1).

TABLE 1

| N | H (in) | W (in) |
|---|--------|--------|
| 1 | 4.55 | 2.85 |
| 2 | 4.55 | 4.66 |
| 3 | 4.55 | 6.47 |
| 4 | 4.55 | 8.29 |
| ... | 4.55 | |
| N | 4.55 | $W_N = W_{N-1} + 1.812$ |

In an aspect of the embodiment, the subplate component 12 has a set of alignment posts 32 as shown in FIGS. 2A–C that project from an outer facing surface of the subplate component. The posts 32 are vertically aligned and engage standard holes in the conventional yoke portions of an electrical device 1000 (as illustrated for example in FIG. 1) to align and position the electrical device within the subplate frame. Similar sets (pairs) of vertically aligned posts $32_1$, $32_2$, ... $32_4$ are illustrated in FIG. 9 for a 4-gang component; and in FIGS. 6A and 8, respectively, for 2-gang and 3-gang components. Adjacent post sets $32_n$ have a standard inter-post pair spacing equal to 1.812 inches.

In an aspect of the embodiment, the subplate component 12 is fabricated from a suitable metalized material or other material having a Young's modulus between about 6 Mpsi to 42 Mpsi. This material specification provides that the subplate component maintains a substantially flat surface after final assembly and installation over a wall surface that may not be substantially flat. Table 2 lists a variety of materials and their Young's Modulus values.

TABLE 2

| | Mpsi |
|---|---|
| METAL | |
| Lead | 5.3 |
| Magnesium | 6.5 |
| Aluminum (all alloys) | 10.3 |
| Cast Iron | 14.5 |
| Brass | 15.4 |
| Phosphor bronze | 16.1 |
| Copper | 17.2 |
| Monel metal | 26.0 |
| Stainless steel (18-8) | 27.6 |
| Carbon steel | 30.0 |
| Inconel | 31.0 |

TABLE 2-continued

| | Mpsi |
|---|---|
| Plastics and other materials: | |
| MATERIAL | |
| ABS | 0.10–0.37 |
| Nylon | 0.18–0.45 |
| Acrylic | 0.20–0.47 |
| Polycarbonate | 0.34–0.86 |
| Alkyd | 0.05–0.30 |
| Amino group | 0.13–0.24 |
| Phenolics | 0.10–0.25 |
| Douglas fir - wood | 1.6 Mpsi |
| Glass | 6.7 Mpsi |

Figure 5B:
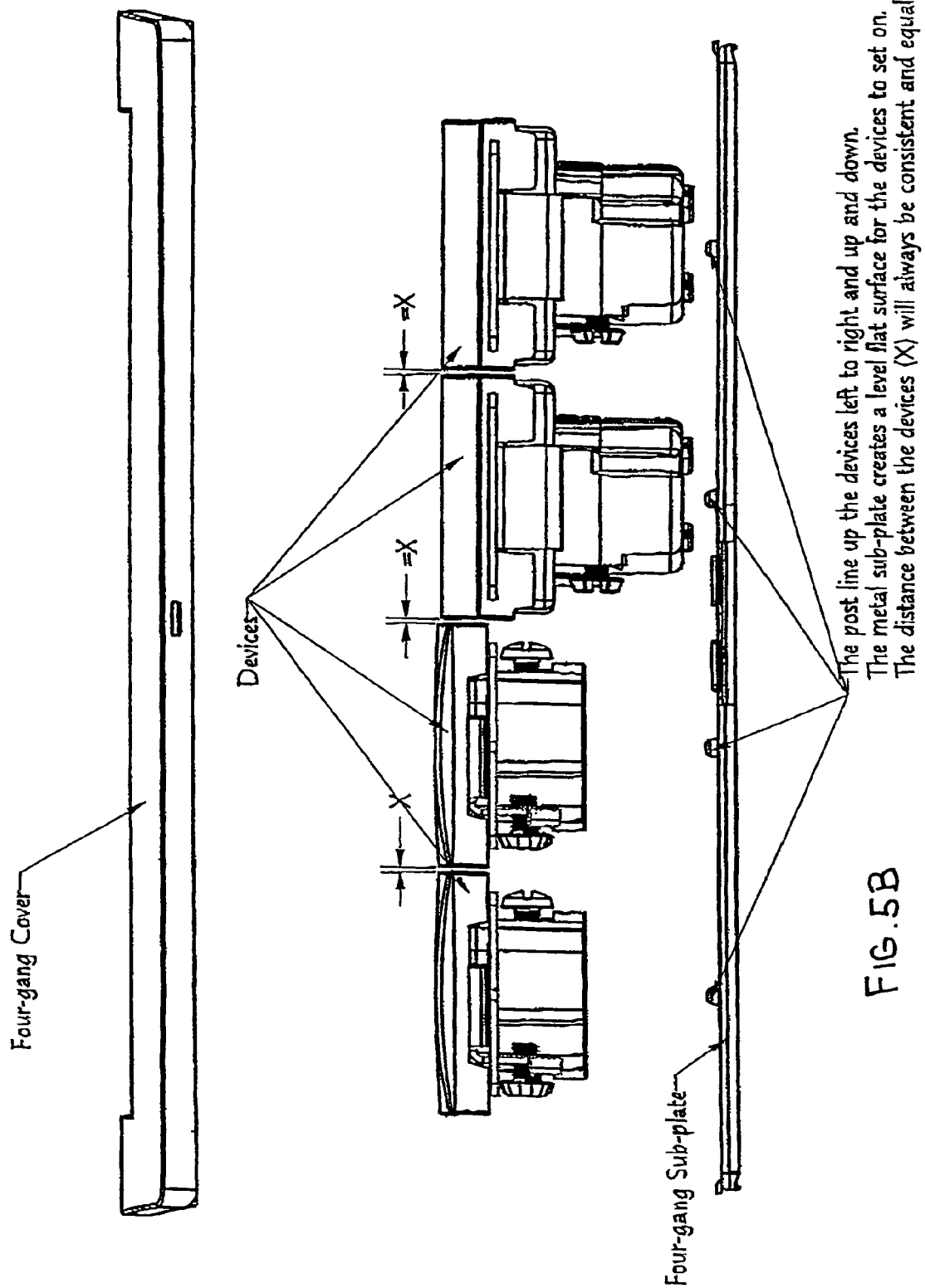
FIG. 5B is a bottom elevational view of the assembly of FIG. 5A.

Those having a value between about 6 Mpsi to 42 Mpsi represent a sample of suitable materials for the subplate component according to aspects of the invention. The advantages of a more rigid subplate assembly than provided by plastic, for example, or a segmented type of subplate component or equivalent as shown in the prior art, will be apparent to a person skilled in the art and based on the description that follows. It will be recognized at the outset that while the subplate component 12 provides the attachment means for the screwless faceplate component of the assembly, the subplate component also serves to position and align the electrical device(s) 1000 such as receptacles, switches, and various others referred to herein. As described above, sets of pins 32 located in the outwardly facing surface of the subplate component 12 are used to align and position from one to N-gang electric devices depending upon the size and capacity of the electrical box. Referring to FIG. 5A, a 4-gang assembly 10 is illustrated with four electrical devices 1000 (not a part of the invention per Sf) to be wired into the electrical box (not shown). It will be appreciated that a constant uniform spacing between each of the electric devices, as illustrated in FIG. 5B, must be maintained for both safety and cosmetic reasons. However, if the wall surface upon which the subplate component sets is uneven and/or the subplate component 12 does not have sufficient rigidity, then fixing of the electric devices to the electrical box by conventional screw fasteners may cause the inter-device spacing, X, to change and/or become non-uniform. Thus, a metallized or other suitably rigid material will provide a subplate component with the structural stability to maintain the substantially uniform separation, X, between electric devices upon assembly. In an alternative aspect of the embodiment, the subplate component 12 includes a gusset rib 28 as shown for example in FIG. 2A located on the front (outside) surface of the subplate component intermediate the outer perimeter 26 and the inner perimeter 22 of the subplate component. It could also be on the back, inside surface. The gusset rib 28 may be an integral part of the subplate component as, for example, a surface deformation that adds strength to the structure, or may otherwise be a molded, casted, or otherwise integral part of the subplate component. The gusset rib 28 may be continuous or segmented.

Another embodiment of the invention is directed to a monolithic faceplate component 14 of a screw less faceplate assembly 10 as shown, for example, in FIGS. 3 and 4 for a single-gang component, in FIG. 7 for a 2-gang component, and in FIG. 8 for a 3-gang component. Referring to FIG. 4A, faceplate 14 is in the form of a frame 17 having a front surface 15 and a perimeter surface 18 integral to an edge of the front surface. The faceplate 14 further includes an attachment surface 16' disposed along at least two opposing vertical perimeter surfaces. The attachment surface 16' comprises an attachment structure 30' disposed along at least a pOliion of the attachment surface as shown, for example, in FIGS. 3E and 7E. The attachment structure 30' in an exemplary aspect, is a lip that is engageable with a complimentary lip 30 of a subplate component as described above. The detail of the faceplate attachment structure 30' is illustrated, for example, in FIG. 3C, which shows a tapered region of the engagement edge that upon pressure on the faceplate component against the subplate component will spread slightly to clear the subplate lip and then engage. The lip 30' need not be a single continuous structure as illustrated but may alternatively comprise a plurality of discreet lips integral to attachment surface 16'. As shown in FIG. 7E for a 2-gang faceplate component (and similarly for other N-gang components where N>1), an additional attachment lip 36' is integrally positioned along an inside portion of the outer perimeter horizontal surface 18. Attachment lip 36' is intended to be a complimentary attachment means to engagement assembly 36 of the subplate component described above.

In an aspect of the embodiment as shown in FIG. 7D, the attachment surface 16' has a disengagement aperture 46 to facilitate disengagement of the faceplate from the subplate in the assembled condition. In the multi-gang embodiments, a similar disengagement aperture 46 is located in a horizontal outer perimeter surface as shown in FIG. 7B. In an alternative aspect as illustrated in FIGS. 4B–F, a disengagement region 48 is located along an outer perimeter surface of the faceplate. Disengagement region 48 is intended to be complimentary to disengagement region 27 of subplate component 12' illustrated by example in FIGS. 2D–G.

As shown in FIG. 7A, the faceplate component 14 also has an inner perimeter boundary defined by opposing vertical surfaces $54_v$ and opposing horizontal surfaces $54_h$, the latter of which define the height, H', of the opening 56 to have a value of approximately 2.68 inches. For a single-gang component, the width, W', of the faceplate aperture 56 has a value of approximately 1.85 inches to accommodate a standard single electrical device. For a 2-gang assembly, W' has a value of 3.66 inches. For N=3, W' substantially has a value equal to 5.47 inches, and for N=4, W' substantially equals 7.28 inches (see Table 3). With respect to up/down orientation, the faceplate component 14 is symmetric. Orientation may, however, be dictated by brand indicia or other indicia on the exposed faceplate's surface suggesting a particular orientation.

TABLE 3

| N | H' (in) | W' (in) |
|---|---|---|
| 1 | 2.68 | 1.85 |
| 2 | 2.68 | 3.66 |
| 3 | 2.68 | 5.47 |
| 4 | 2.68 | 7.28 |

Figure 11A:
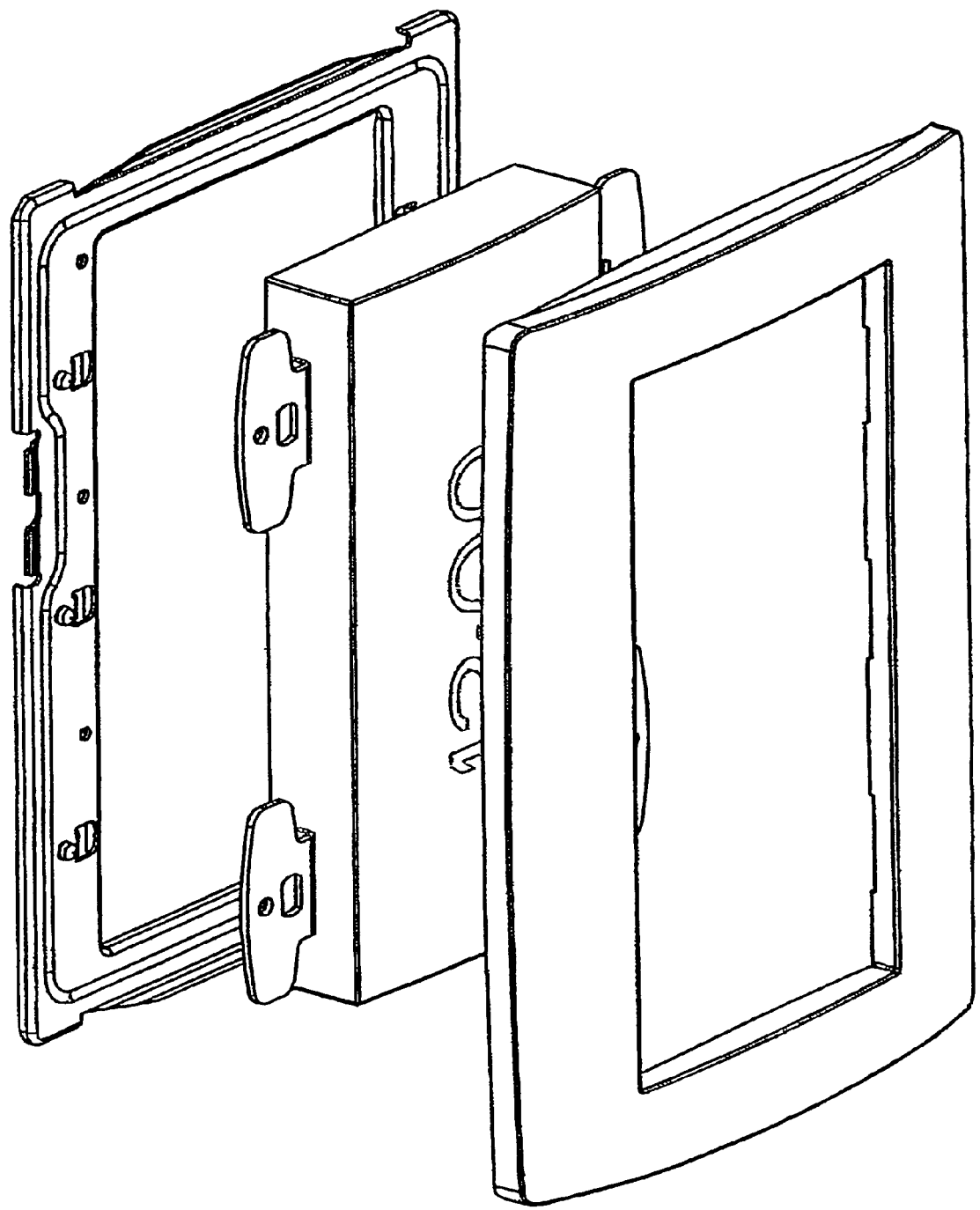
FIG. 11A is an exploded perspective view of a screw less faceplate assembly for accommodating an oversized (3-gang) electrical device according to an embodiment of the invention.
Figure 12:
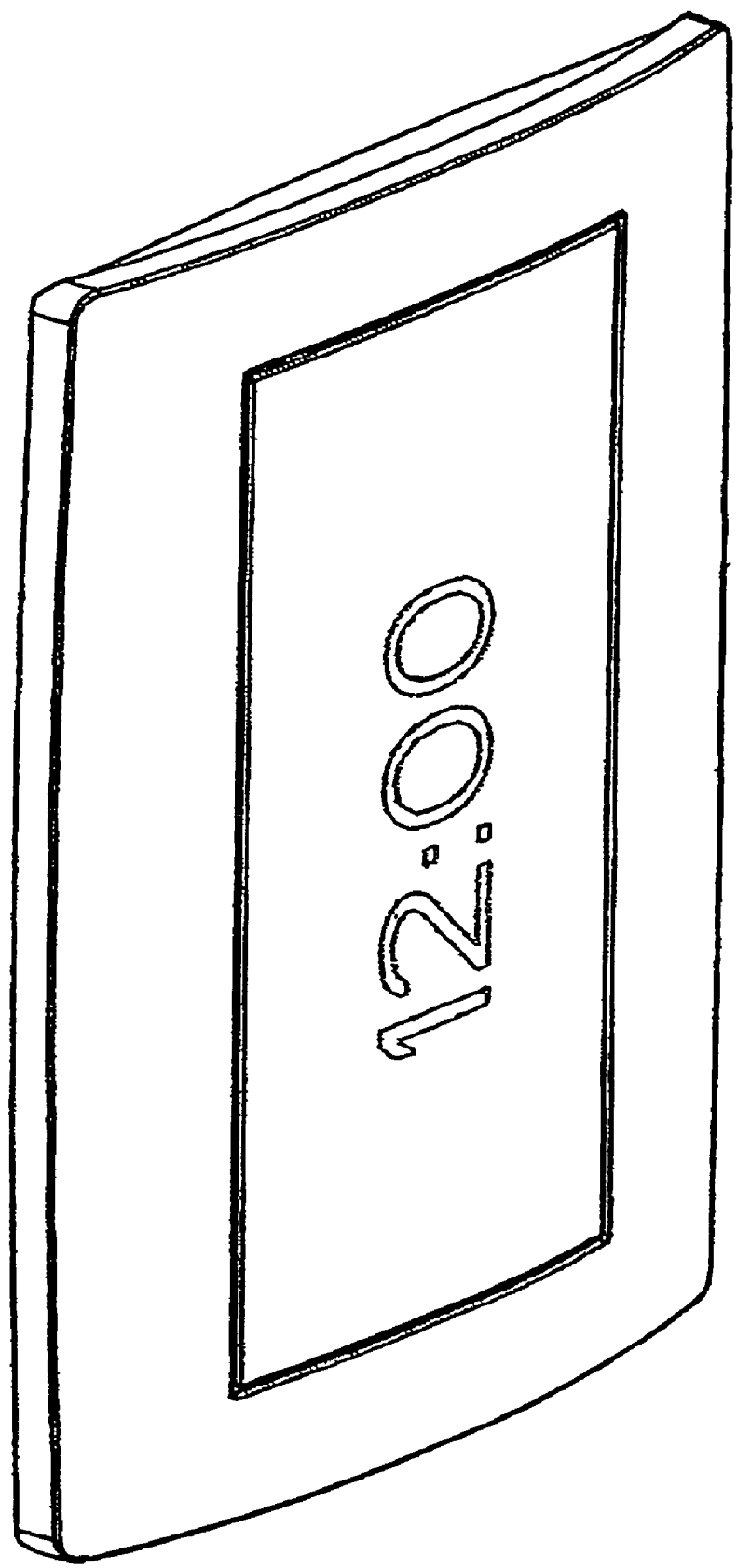
FIG. 12 is a perspective illustration of the assembly of FIG. 11A in an assembled condition.

As will be fully appreciated by those skilled in the art, the uninterrupted nature of the faceplate aperture 56 provides the user with the option to add devices at any future time that would not ordinarily fit in a standard decorator faceplate opening. Such devices include, for example, but are not limited to, an alarm clock, smoke detector, thermostat, step marker, intercom, phone, video screen, switch banks, dimmer banks, receptacles, switches, etc., as illustrated, for example, in FIGS. 11A and 12.

Figure 11B:
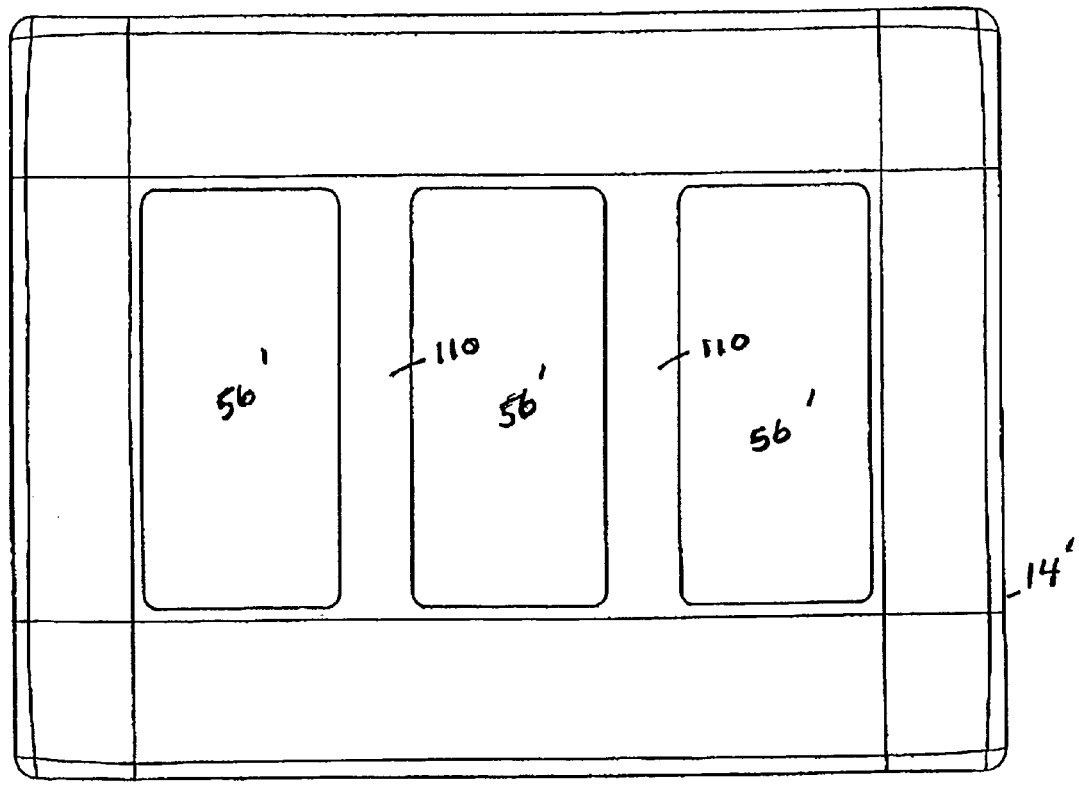
FIGS. 11B–D are various views of a 3-gang faceplate component according to an alternative aspect of the invention.
Figure 11C:
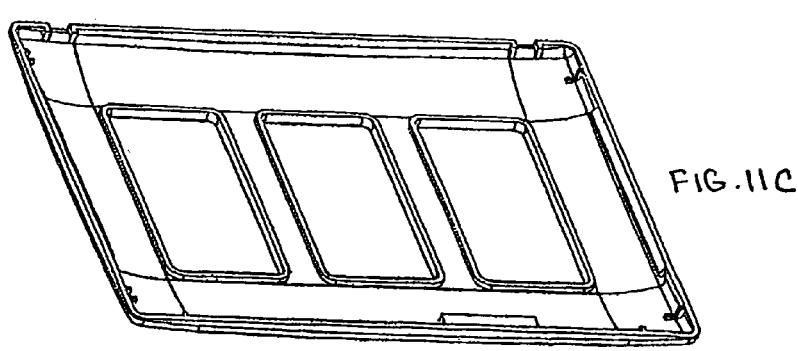
Figure 11D:
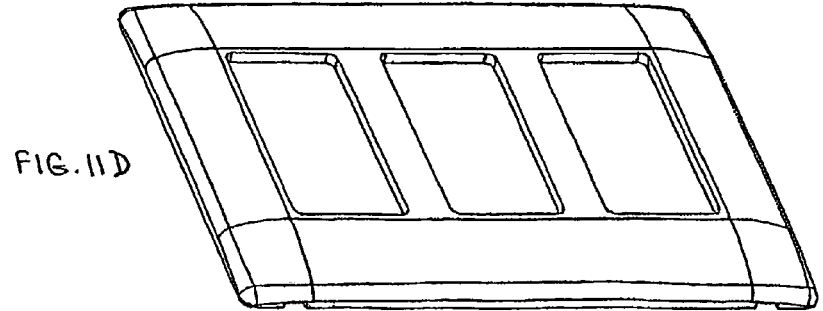

An alternative aspect of the faceplate component is illustrated in FIGS. 11B–D for an exemplary 3-gang component. In this aspect, the faceplate component 14' includes vertically oriented support regions 110 within the opening 56. The support regions provide structural integrity and cosmetics. As shown, the aperture 56 has been divided into three single-gang sub-apertures 56'. Numerous variations on the number of sub-apertures for an N-gang component are envisioned. Each resulting sub-aperture 56' will be sized accordingly to accommodate a particular electrical device.

In an aspect of the embodiment as shown, for example, in FIG. 3D, an outer face surface 15 of the faceplate component has an elliptical shape profile 40 when observed in vertical cross section. The elliptical profile may be substantially flat in a central region of the faceplate component as shown at 40', blending into a curved profile shape 40" above and below the central region. The flat shape characteristic of the central region 40' provides the faceplate component 14 with a flush surface fit around the surface face of an electrical device, which is typically flat. Alternatively, the faceplate profile may be flat or otherwise shaped based upon design and manufacturing considerations.

According to another embodiment of the invention, a screw less faceplate assembly consists of a single monolithic subplate component and a single monolithic faceplate component that is removeably attachable to the subplate component. The subplate component and the faceplate component have respective, integral, complimentary engagement means only located on or immediately adjacent outer perimeter surfaces thereof. Exemplary views of the screw less faceplate assembly embodiments are shown in FIGS. 1, 5A, 8, 10, 11A and 12.

The foregoing embodiments and aspects of the invention are disclosed herein by way of examples only and are not intended to limit the scope of the present invention, which is solely defined by the appended claims. A person of ordinary skill in the art will appreciate many variations and modifications within the scope of this invention.

I claim:

1. A subplate component of a screwless faceplate assembly, the subplate comprising:
   a single monolithic subplate component configured as a frame, the component having an outer perimeter defined by opposing outer horizontal surfaces and opposing outer vertical surfaces, and an inner perimeter defined by opposing inner horizontal surfaces and opposing inner vertical surfaces, said inner perimeter defining a closed subplate opening configured to accommodate an N-gang device body, N being an integer value, a size of said subplate opening being a function of N;
   an integral attachment structure formed in at least one of the opposing outer horizontal surfaces of the subplate component, the integral attachment structure being configured to align and mate with a corresponding portion of a faceplate; and at least one device alignment element disposed along a central longitudinal axis of said single monolithic subplate component, said at least one device alignment element also being disposed between one of said outer horizontal surfaces and a corresponding one of said inner horizontal surfaces.

2. The subplate component of claim 1, wherein the structure includes a lip integrated into at least a portion of an outer perimeter surface.

3. The subplate component of claim 1, wherein the structure includes a tab member integrated into at least a portion of an outer perimeter surface.

4. The subplate component of claim 1, wherein said at least one alignment element includes at least one set of vertically aligned posts for locating a device with respect to the subplate.

5. The subplate component of claim 1, wherein the subplate opening is sized to accommodate a single-gang device.

6. The subplate component of claim 1, wherein the subplate opening is sized to accommodate a double-gang device.

7. The subplate component of claim 1, wherein the subplate opening is sized to accommodate a three-gang device.

8. The subplate component of claim 1, wherein the subplate opening is sized to accommodate a four-gang device.

9. The subplate component of claim 1, wherein N is an integer less than or equal to eight (8).

10. The subplate component of claim 1, wherein the subplate is a metallic material.

11. The subplate component of claim 1, wherein said at least one alignment element includes N sets of separately vertically aligned posts for locating N sets of devices with respect to the subplate, each set of said N sets of posts being vertically aligned with a vertical centerline.

12. The subplate component of claim 11, wherein adjacent vertical centerlines have a standard separation distance of about 1.81 inches.

13. The subplate component of claim 12, wherein said outer horizontal surfaces each include a single engagement assembly for engaging a faceplate attachment region.

14. The subplate component of claim 1, wherein said outer perimeter has a dimension that is sufficient to fully cover a maximum perimeter dimension of an old-work electrical box.

15. The subplate component of claim 1, wherein the subplate component is made of a material having a Young's Modulus greater than about 6 mega pounds per square inch (Mpsi).

16. The subplate component of claim 15, wherein the subplate component is made of a material having a Young's Modulus in a range between about 6 mega pounds per square inch to 42 mega pounds per square inch (Mpsi).

17. A screw less faceplate assembly, comprising:
   a single monolithic subplate component configured as a frame, the component having an outer perimeter defined by opposing outer horizontal surfaces and opposing outer vertical surfaces, and an inner perimeter defined by opposing inner horizontal surfaces and opposing inner vertical surfaces, said inner perimeter defining a closed subplate opening configured to accommodate an N-gang device body, N being an integer value, a size of said subplate opening being a function of N, an integral attachment structure formed in at least one of the opposing outer horizontal surfaces of the subplate component, the integral attachment structure being configured to align and mate with a corresponding portion of a faceplate, and at least one device alignment element disposed along a central longitudinal axis of said single monolithic subplate component, said at least one device alignment element also being disposed between one of said outer horizontal surfaces and a corresponding one of said inner horizontal surface; and a single screwless monolithic faceplate component including the corresponding portion of the faceplate that is configured to engage and compliment the device and the subplate component such that the device is disposed between the faceplate component and the subplate component, a portion of the device being at least partially accessible, and wherein the subplate component is substantially hidden behind the faceplate component.

18. The assembly of claim 17, wherein N is an integer less than or equal to eight (8).

19. The subplate component of claim 17, wherein the subplate component is made of a material having a Young's Modulus in a range between about 6 mega pounds per square inch to 42 mega pounds per square inch (Mpsi).

20. The assembly of claim 17, wherein the subplate is a metallic material.

* * * * *